(12) United States Patent
Jin et al.

(10) Patent No.: US 12,390,048 B2
(45) Date of Patent: Aug. 19, 2025

(54) TURKEY COOKING DEVICE

(71) Applicant: LOCO—CRAZY GOOD COOKERS, INC., Columbus, GA (US)

(72) Inventors: Weidong Jin, Shenzhen (CN); Blake Levien, Katy, TX (US); McDonald Plummer, III, Milton, GA (US); Chau Nam Wai, Kennedy Town (HK)

(73) Assignee: LOCO—CRAZY GOOD COOKERS, INC., Columbus, GA (US)

( * ) Notice: Subject to any disclaimer, the term of this patent is extended or adjusted under 35 U.S.C. 154(b) by 0 days.

(21) Appl. No.: 18/624,708

(22) Filed: Apr. 2, 2024

(65) Prior Publication Data

US 2024/0324816 A1 Oct. 3, 2024

Related U.S. Application Data

(63) Continuation of application No. 16/172,189, filed on Oct. 26, 2018, now Pat. No. 11,963,636.

(51) Int. Cl.
*A47J 37/12* (2006.01)
*A47J 37/07* (2006.01)

(52) U.S. Cl.
CPC ....... *A47J 37/1247* (2013.01); *A47J 37/0713* (2013.01); *A47J 37/1204* (2013.01);
(Continued)

(58) Field of Classification Search
CPC .... A47J 37/12; A47J 37/1247; A47J 37/0713; A47J 37/1204; A47J 37/1219;
(Continued)

(56) References Cited

U.S. PATENT DOCUMENTS

| 6,711,992 B1 | 3/2004 | McLemore |
| 7,237,547 B1 | 7/2007 | Bourgeois |

(Continued)

FOREIGN PATENT DOCUMENTS

EP 0499062 A1 * 8/1992

*Primary Examiner* — Steven W Crabb
*Assistant Examiner* — Alba T Rosario-Aponte
(74) *Attorney, Agent, or Firm* — Polsinelli PC (57) ABSTRACT

A turkey cooking device comprises a base, a burner, a gas supply device, a turkey pot, a temperature control device disposed on the base or the burner, and a safety valve disposed on the burner. The burner and the turkey pot are disposed on the base. The burner is located below the turkey pot and connected to the gas supply device. The temperature control device comprises a temperature controller, which abuts against the outer circumferential wall of the turkey pot, is electrically connected to the safety valve and controls the burner to open or close through the safety valve. The temperature control device controls the safety valve to close to cut off a gas source when detecting that the temperature of the outer circumferential wall of the turkey pot reaches a preset temperature, so that the situation that food is affected under an excessively-high oil temperature and consequentially the health of eaters is affected is prevented; user attendance is not needed, and the device can be easily and conveniently operated by users; and fire accidents caused by spontaneous combustion of cooking oil under an excessively-high temperature can be prevented.

16 Claims, 8 Drawing Sheets

(52) U.S. Cl.
CPC ....... *A47J 37/1219* (2013.01); *A47J 37/1242* (2013.01); *A47J 37/1266* (2013.01); *A47J 37/1276* (2013.01)

(58) Field of Classification Search
CPC ................ A47J 37/1242; A47J 37/1266; A47J 37/1276; A47J 37/1295
USPC .......................................... 99/324, 403, 418
See application file for complete search history.

(56) References Cited

U.S. PATENT DOCUMENTS

| | | | |
|---|---|---|---|
| 8,938,870 B1* | 1/2015 | Bourgeois | A47J 37/0713 126/38 |
| 2003/0179653 A1 | 9/2003 | McLemore et al. | |
| 2005/0172949 A1* | 8/2005 | Moore | A47J 37/1242 126/39 G |
| 2009/0183729 A1* | 7/2009 | Barkhouse | G05D 23/22 126/39 BA |
| 2010/0275897 A1* | 11/2010 | May | F24C 3/126 126/42 |
| 2016/0353929 A1* | 12/2016 | McLemore | A23B 4/052 |
| 2017/0059178 A1 | 3/2017 | Lando et al. | |

* cited by examiner

TURKEY COOKING DEVICE

CROSS-REFERENCE TO RELATED APPLICATIONS

The present application claims priority to U.S. patent application Ser. No. 16/172,189 filed on Oct. 26, 2018, which is incorporated by reference in its entirety herein.

BACKGROUND OF THE INVENTION

1. Field of the Invention

The invention relates to cooking devices, in particular to a turkey cooking device.

2. Description of the Related Art

With the improvement of the material living standard, more and more people have time to cook delicious food. Some manufacturers have designed special material processors for certain food materials, such as turkey cooking devices.

Existing turkey cooking devices comprise a gas supply device, a base and a turkey pot erected on the base, wherein the base is provided with a burner connected to the gas supply device. Although these turkey cooking devices can basically complete the turkey cooking process, due to the lack of a temperature control device, hazardous substances will be generated by cooking oil when the oil temperature in the turkey pot is too high, and the health of eaters is threatened by these hazardous substances adhering to turkey; moreover, the taste of the turkey may be affected under the high oil temperature; and besides, continuous rising of the oil temperature may result in burning of the hot oil in the turkey pot, and even accidents can be caused in severe cases.

SUMMARY OF THE INVENTION

The technical issue to the settled by the invention is to provide a turkey cooking device capable of regulating and controlling the oil temperature.

To settle the aforesaid technical issue, the invention adopts the following technical scheme: A turkey cooking device comprises a base, a burner, a gas supply device and a turkey pot. The burner and the turkey pot are disposed on the base. The burner is located below the turkey pot and is connected to the gas supply device. The turkey cooking device further comprises a temperature control device disposed on the base or the burner and a safety valve disposed on the burner. The temperature control device comprises a temperature controller abutting against the outer circumferential wall of the turkey pot. The temperature controller is electrically connected to the safety valve and controls the burner to open or close through the safety valve.

Furthermore, the temperature control device further comprises a heat-conduction block, a mounting base and elastic pieces. The temperature controller is connected to the heat-conduction block and abuts against the outer circumferential wall of the turkey pot through the heat-conduction block. An opening is formed in one side of the mounting base. The heat-conduction block, the elastic pieces and the temperature controller are located in the mounting base. The elastic pieces are connected to the mounting base and the heat-conduction block and drive the heat-conduction block to stretch out of the opening.

Furthermore, the temperature control device further comprises guide rods disposed in the mounting base. The heat-conduction block is provided with guide holes matched with the guide rods. The elastic pieces are springs disposed around guide rods.

Furthermore, a side, close to the turkey pot, of the heat-conduction block is provided with a first guide slope, and the first guide slope is disposed close to the top of the heat-conduction block.

Furthermore, the base comprises a triangular mounting frame and three vertical supports. The burner is mounted on the mounting frame. The turkey pot is erected on the mounting frame. The three vertical supports are arrayed in a triangular shape. Each vertical support is connected to the mounting frame.

Furthermore, the top ends of the vertical supports protrude out of the top surface of the mounting frame, and the bottom end of the turkey pot is located among the three vertical supports.

Furthermore, shock absorbers are arranged on the top surfaces of the vertical supports.

Furthermore, the base comprises a four-leg stand and a mounting frame assembly disposed at the top of the four-leg stand. The mounting frame assembly comprises a plurality of guide plates. The turkey pot is placed on the guide plates. The top surfaces of the guide plates are provided with second guide slopes.

Furthermore, the turkey cooking device further comprises a wind-shield ring. The top of the wind-shield ring is connected to the guide plates. The burner is located in the wind-shield ring.

Furthermore, the turkey cooking device further comprises a fixing frame used for fixing the burner and connected to the base.

Furthermore, the burner comprises a gas pipeline connected to the gas supply device, and the safety valve is disposed on the gas pipeline.

Furthermore, the turkey pot comprises an outer cylinder, a cylinder cover and a colander. The colander is disposed in the outer cylinder. An opening in the top of the outer cylinder is covered with the cylinder cover.

Furthermore, a temperature gauge is disposed on the cylinder cover and has an end stretching into the outer cylinder and an end exposed to the outside.

The turkey cooking device of the invention has the following beneficial effects. The temperature control device is arranged and can control the safety valve to close to cut off a gas source when detecting that the temperature of the outer circumferential wall of the turkey pot reaches a preset temperature, so that the situation that the food is affected under an excessively-high oil temperature and consequentially the health of eaters is affected is prevented; meanwhile, the taste of the turkey is ensured, and accordingly, user experience is improved; user attendance is not needed, and the turkey cooking device can be easily and conveniently operated by users; and fire accidents caused by spontaneous combustion of the cooking oil under an excessively-high temperature can be prevented.

REFERENCE SIGNS

1, base;
11, vertical support;
12, mounting frame;
13, triangular base plate;
13, four-leg stand;
15, guide plate;
2, burner;
3, gas supply device;
4, turkey pot;
41, cylinder cover;
42, temperature gauge;
5, temperature control device;
51, temperature controller;
52, heat-conduction block;
521, guide hole;
522, first guide slope;
523, concave arc face;
53, mounting base;
54, elastic piece;
55, guide rod;
6, safety valve;
7, shock absorber

DETAILED DESCRIPTION OF THE INVENTION

A detailed description of the technical contents, objectives and effects of the invention is given as follows in combination with the embodiments and drawings.

The key conception of the invention lies in that a temperature control device and a safety valve are arranged, so that when detecting that the temperature of the outer circumferential wall of a turkey pot rises to a preset temperature, the temperature control device controls the safety valve to cut off a gas source and to stop a stove fire.

As show in FIGS. 1-5, a turkey cooking device comprises a base 1, a burner 2, a gas supply device 3 and a turkey pot 4, wherein the burner 2 and the turkey pot 4 are disposed on the base 1, and the burner 2 is located below the turkey pot 4 and is connected to the gas supply device 3. The turkey cooking device further comprises a temperature control device 5 disposed on the base 1 or the burner 2 and a safety valve 6 disposed on the burner 2. The temperature control device 5 comprises a temperature controller 51 abutting against the outer circumferential wall of the turkey pot 4. The temperature controller 51 is electrically connected to the safety valve 6 and controls the burner 2 to open or close through the safety valve 6.

From the above description, the turkey cooking device has the following beneficial effects. The temperature control device is arranged and can control the safety valve to close to cut off a gas source when detecting that the temperature of the outer circumferential wall of the turkey pot reaches a preset temperature, so that the situation that the food is affected under an excessively-high oil temperature and consequentially the health of eaters is affected is prevented; meanwhile, the taste of turkey is ensured, and accordingly, user experience is improved; user attendance is not needed, and the turkey cooking device can be easily and conveniently operated by users; and fire accidents caused by spontaneous combustion of the cooking oil under an excessively-high temperature are prevented.

Figure 4:
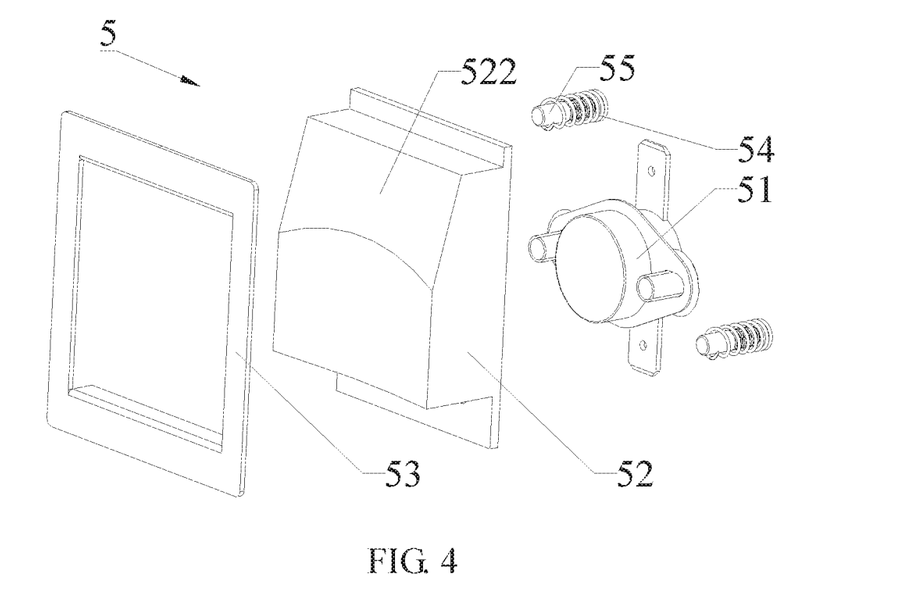
FIG. 4 is an exploded view of a temperature control device of the turkey cooking device in embodiment 1 of the invention.
Figure 5:
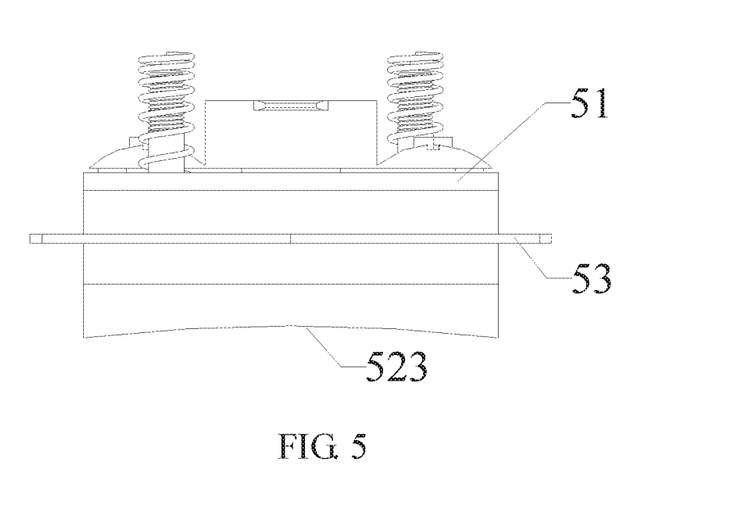
FIG. 5 is a top view of the temperature control device of the turkey cooking device in embodiment 1 of the invention.

Furthermore, the temperature control device 5 further comprises a heat-conduction block 52, a mounting base 53 and elastic pieces 54. The temperature controller 51 is connected to the heat-conduction block 52 and abuts against the outer circumferential wall of the turkey pot 4 through the heat-conduction block 52. An opening is formed in one side of the mounting base 53. The heat-conduction block 52, the elastic pieces 54 and the temperature controller 51 are located in the mounting base 53. The elastic pieces 54 are connected to the mounting base 53 and the heat-conduction block 52 and drive the heat-conduction block 52 to stretch out of the opening.

From the above description, the heat-conduction block can protect the temperature controller against crushing damage when the users place the turkey pot on the base, and the heat-conduction block can be in closer contact with the turkey pot through the elastic pieces, so that data detected by the temperature controller are more accurate.

Furthermore, the temperature control device 5 further comprises guide rods 55 disposed in the mounting base 53. The heat-conduction block 52 is provided with guide holes 521 matched with the guide rods 55. The elastic pieces 54 are springs disposed around the guide rods 55.

From the above description, the guide rods can guide the movement of the heat-conduction block.

Furthermore, a side, close to the turkey pot 4, of the heat-conduction block 52 is provided with a first guide slope 522, and the first guide slope 522 is disposed close to the top of the heat-conduction block 52.

From the above description, the guide slope can ensure normal retraction of the heat-conduction block, and thus, the structural reliability of the turkey cooking device is improved.

Figure 1:
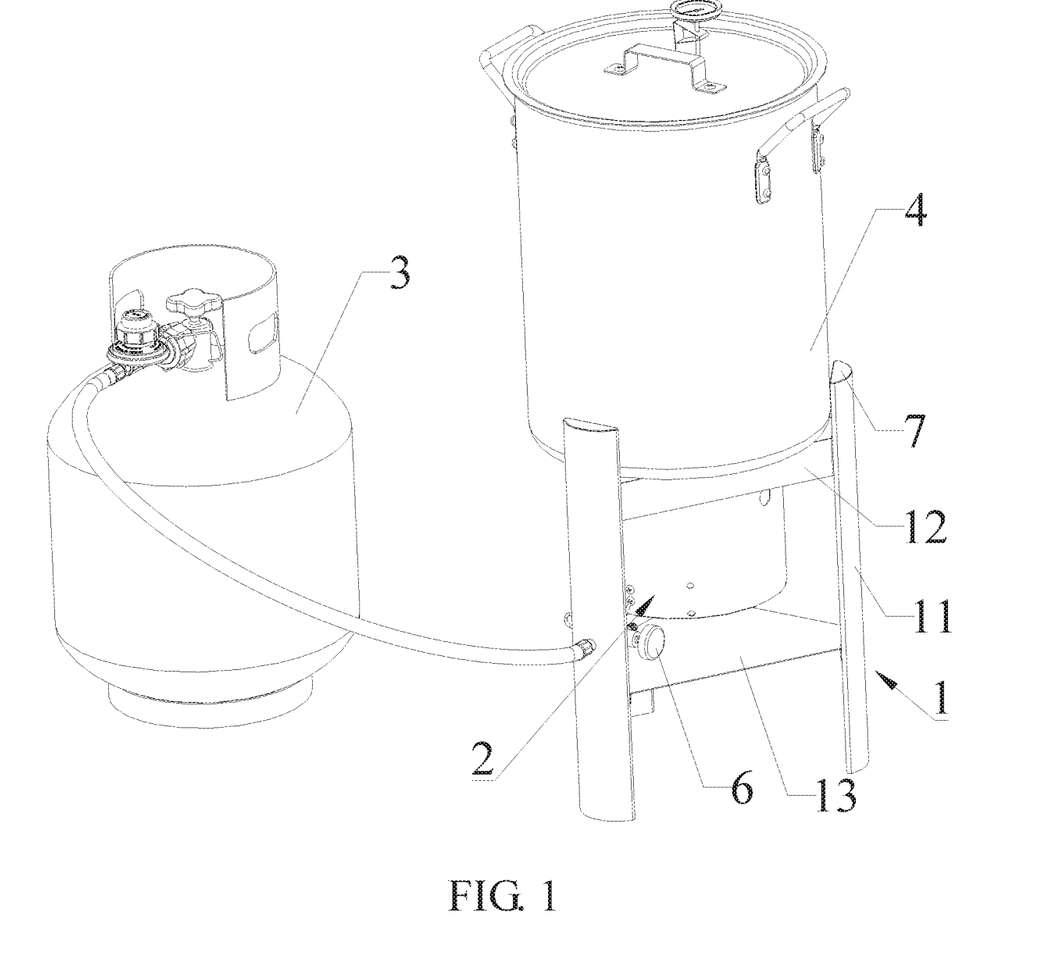
FIG. 1 is an overall structural view of a turkey cooking device in embodiment 1 of the invention.
Figure 2:
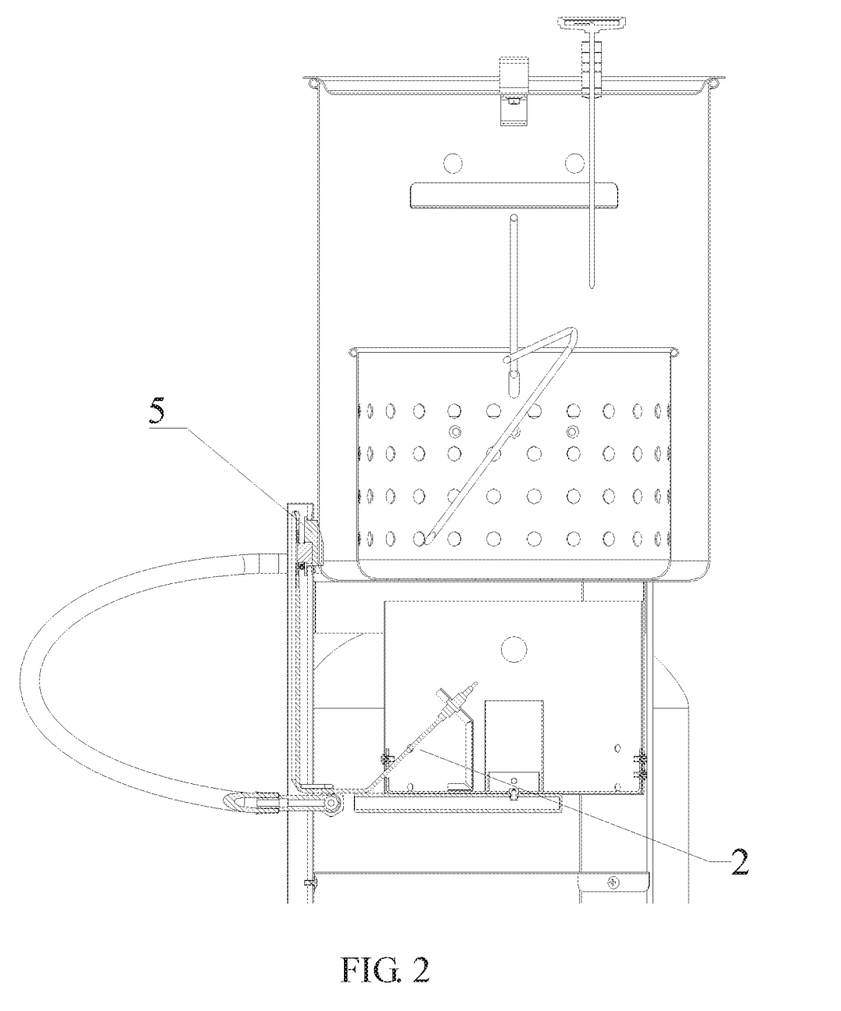
FIG. 2 is a sectional view of the turkey cooking device in embodiment 1 of the invention.

Furthermore, the base 1 comprises a triangular mounting frame 12 and three vertical supports 11. The burner 2 is disposed on the mounting frame 12. The turkey pot 4 is erected on the mounting frame 12. The three vertical supports 11 are arrayed in a triangular shape. Each vertical support 11 is connected to the mounting frame 12.

Furthermore, the top ends of the vertical supports 11 protrude out of the top surface of the mounting frame 12. The bottom end of the turkey pot 4 is located among the three vertical supports 11. From the above description, the top ends of the vertical supports can position the turkey pot to a certain extent, and thus, the turkey pot is prevented from toppling.

Furthermore, shock absorbers 7 are disposed on the top surfaces of the vertical supports 11.

From the above description, the shock absorbers can protect the turkey pot against scratches caused by the vertical supports, and thus, user experience is improved.

Figure 6:
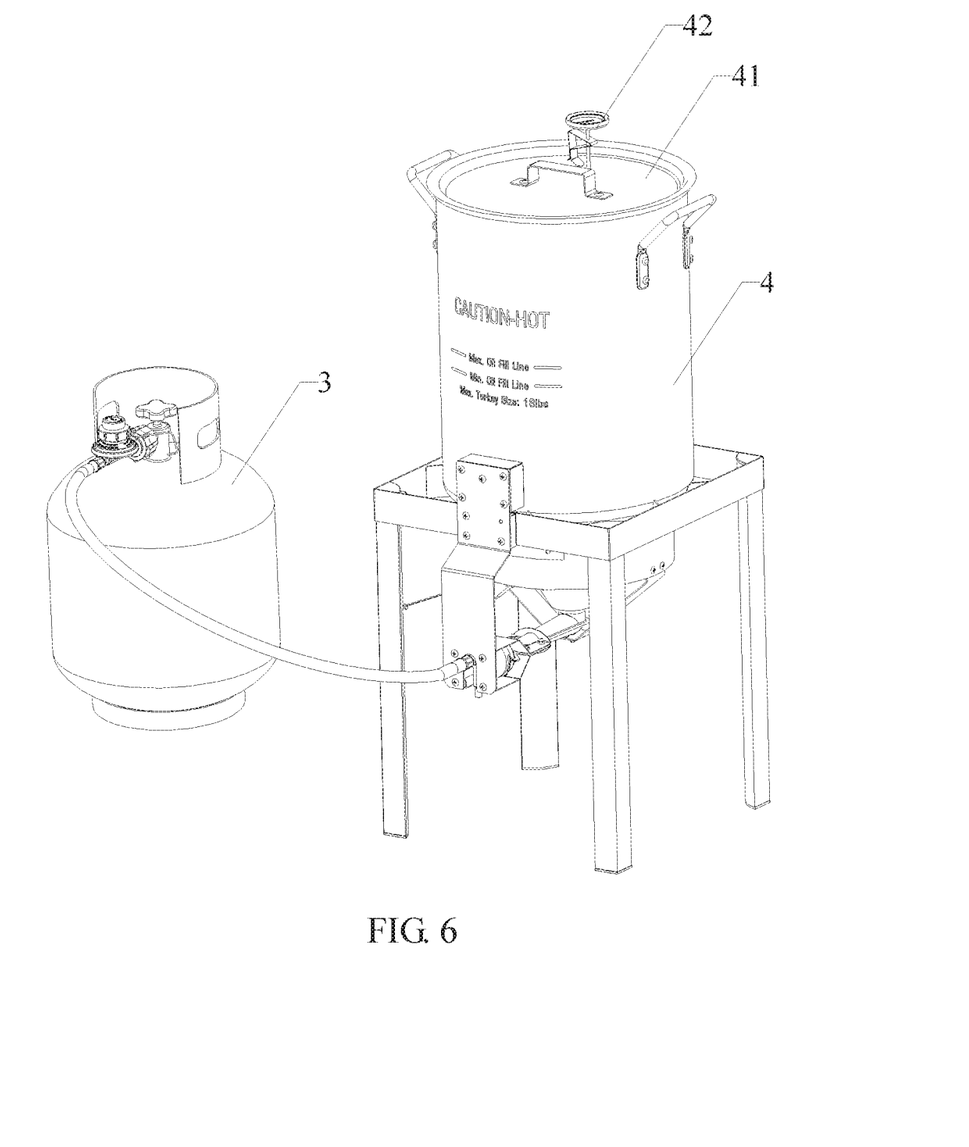
FIG. 6 is an overall structural view of a turkey cooking device in embodiment 2 of the invention.
Figure 7:
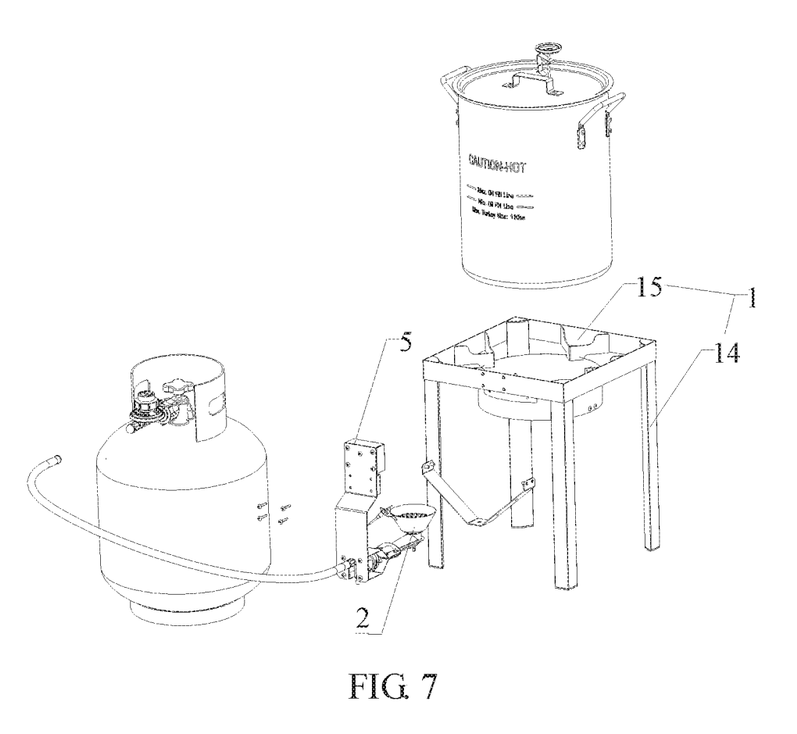
FIG. 7 is an exploded view of the turkey cooking device in embodiment 2 of the invention.

Furthermore, the base 1 comprises a four-leg stand 14 and a mounting frame assembly arranged at the top of the four-leg stand 14. The mounting frame assembly comprises a plurality of guide plates 15. The turkey pot 4 is disposed on the guide plate 15. The top surfaces of the guide plates 15 are provided with second guide slopes.

From the above description, the guide slopes of the guide plates can prevent the turkey pot from moving in the horizontal direction.

Furthermore, the turkey cooking device further comprises a wind-shield ring. The top of the wind-shield ring is connected to the guide plates 15. The burner 2 is located in the wind-shield ring.

From the above description, a space defined by the burner, the wind-shield ring and the guide plates is not affected by outside airflow, so that the heating stability of the burner is ensured, and potential safety hazards are eliminated.

Furthermore, the turkey cooking device further comprises a fixing frame used for fixing the burner 2 and connected to the base 1.

Figure 3:
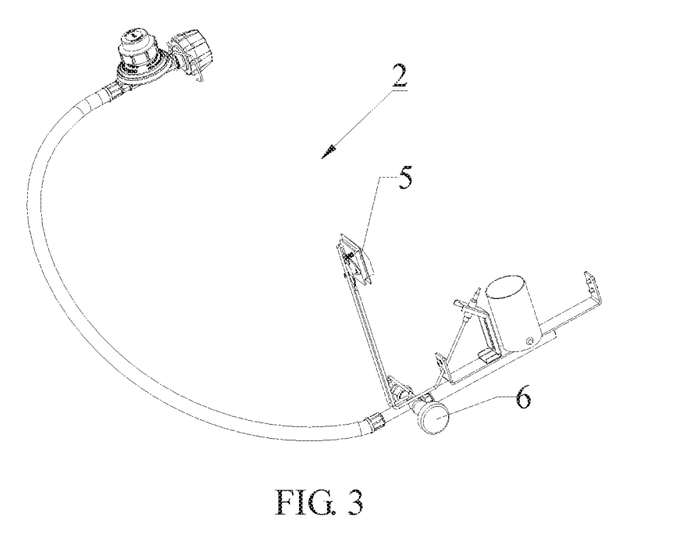
FIG. 3 is a structural view of a burner of the turkey cooking device in embodiment 1 of the invention.

Furthermore, the burner 2 comprises a gas pipeline connected to the gas supply device 3, and the safety valve 6 is disposed on the gas pipeline.

Furthermore, the turkey pot 4 comprises an outer cylinder, a cylinder cover 41 and a colander, wherein the colander is disposed in the outer cylinder, and an opening in the top of the outer cylinder is covered with the cylinder cover 41.

Furthermore, a temperature gauge 42 is disposed on the cylinder cover 41 and has an end stretching into the outer cylinder and an end exposed to the outside.

From the above description, the users can observe the oil temperature condition in the turkey pot in real time through the temperature gauge.

Embodiment 1

Embodiment 1: As shown in FIGS. 1-5, the turkey cooking device comprises a base 1, a burner 2, a gas supply device 3 and a turkey pot 4. The burner 2 and the turkey pot 4 are disposed on the base 1. The burner 2 is located below the turkey pot 4 and is connected to the gas supply device 3. The base 1 is in a triangular column shape. The turkey cooking device further comprises a temperature control device 5 disposed on the base 1 or the burner 2 and a safety valve 6 disposed on the burner 2. The temperature control device 5 comprises a temperature controller 51 abutting against the outer circumferential wall of the turkey pot 4. The temperature controller 51 is electrically connected to the safety valve 6 and controls the burner 2 to open or close through the safety valve 6. Particularly, the burner 2 comprises a gas pipeline connected to the gas supply device 3, and the safety valve 6 is disposed on the gas pipeline.

The turkey pot 4 comprises an outer cylinder, a cylinder cover 41 and a colander. The colander is disposed in the outer cylinder. An opening in the top of the outer cylinder is covered with the cylinder cover 41. A temperature gauge 42 is disposed on the cylinder cover 41 and has an end stretching into the outer cylinder and an end exposed to the outside.

The temperature control device 5 further comprises a heat-conduction block 52, a mounting base 53 and elastic pieces 54. The temperature controller 51 is connected to the heat-conduction block 52 and abuts against the outer circumferential wall of the turkey pot 4 through the heat-conduction block 52. An opening is formed in one side of the mounting base 53. The heat-conduction block 52, the elastic pieces 54 and the temperature controller 51 are located in the mounting base 53. The elastic pieces 54 are connected to the mounting base 53 and the heat-conduction block 52 and drive the heat-conduction block 52 to stretch out of the opening. In this embodiment, the mounting base 53 comprises a bottom shell and a face shell which are detachably connected to each other, and the opening is located in the face shell.

Preferably, the temperature control device 5 further comprises guide rods 55 disposed in the mounting base 53. The heat-conduction block 52 is provided with guide holes 521 matched with the guide rods 55. The elastic pieces 54 are springs disposed around the guide rods 55. Optionally, each guide rod 55 has an end provided with a threaded part, and the mounting base 53 is fixedly disposed on the burner 2 or the base 1 through the threaded parts.

Furthermore, a side, close to the turkey pot 4, of the heat-conduction block 52 is provided with a first guide slope 522, and the first guide slope 522 is disposed close to the top of the heat-conduction block 52. Optionally, the side, close to the turkey pot 4, of the heat-conduction block 52 is further provided with a concave arc face 523.

The base 1 comprises a triangular mounting frame 12 and three vertical supports 11. The burner 2 is mounted on the mounting frame 12. The turkey pot 4 is erected on the mounting frame 12. The three vertical supports 11 are arrayed in a triangular shape. Each vertical support 11 is connected to the mounting frame 12. Optionally, the base 1 further comprises a triangular base plate 13, which is connected to the three vertical supports 11 and located below the mounting frame 12.

To enable users to conveniently place the turkey pot 4 and to prevent the turkey pot 4 from toppling, the top ends of the vertical supports 11 protrude out of the top surface of the mounting frame 12. The bottom end of the turkey pot 4 is located among the three vertical supports.

Optionally, shock absorbers 7 are disposed on the top surfaces of the vertical supports 11. The shock absorbers 7 can be rubber pads.

Embodiment 2

Figure 8:
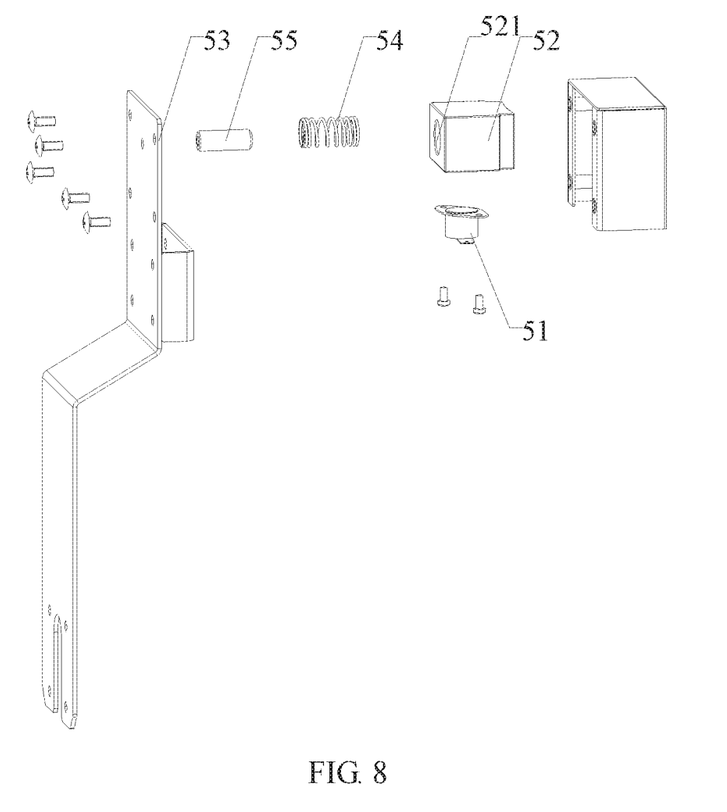
FIG. 8 is an exploded view of a temperature control device of the turkey cooking device in embodiment 2 of the invention.

As shown in FIGS. 6-8, embodiment 2 is different from embodiment 1 in the following aspects: in this embodiment, the base 1 comprises a four-leg stand 14 and a mounting frame assembly disposed at the top of the four-leg stand 14. The mounting frame assembly comprises a plurality of guide plates 15. The turkey pot 4 is placed on the guide plates 15. The top surfaces of the guide plates 15 are provided with second guide slopes.

Particularly, the turkey cooking device further comprises a wind-shield ring. The top of the wind-shield ring is connected to the guide plates 15. The burner 2 is located in the wind-shield ring.

Specifically, the turkey cooking device further comprises a fixing frame used for fixing the burner 2 and connected to the base 1.

Preferably, the temperature control device 5 further comprises guide rods 55 mounted in the mounting base 53. The heat-conduction block 52 is provided with guide holes 521 matched with the guide rods 55. The elastic pieces 54 are springs disposed around the guide rods 55. The mounting base 53 has an end provided with the temperature controller 51, the heat-conduction block 52, the guide rods 55 and other elements and an end used for fixing the gas pipeline.

In conclusion, the temperature control device is arranged and can control the safety valve to close to cut off a gas source when detecting that the temperature of the outer circumferential wall of the turkey pot reaches a preset temperature, so that the situation that food is affected under an excessively-high temperature and consequentially the health of eaters is affected is prevented; meanwhile, the taste of the turkey is ensured, and accordingly, user experience is improved; user attendance is not needed, and the turkey cooking device can be easily and conveniently operated by users; fire accidents caused by spontaneous combustion of cooking oil under an excessively-high temperature can be prevented; the heat-conduction block can protect the temperature controller against crushing damage when the users place the turkey pot on the base, and the heat-conduction block can be in closer contact with the turkey pot through the elastic pieces, so that data detected by the temperature controller is more accurate; the guide rods can guide the movement of the heat-conduction block; the guide slope ensures normal retraction of the heat-conduction block, and thus, the structural reliability of the turkey cooking device is improved; the top ends of the vertical supports can position the turkey pot to a certain extent, so that the turkey pot is prevented from toppling; the shock absorbers can protect the turkey pot against scratches caused by the vertical supports, and thus, user experience is improved; the guide slopes on the guide plates prevent the turkey pot from moving in the horizontal direction; the space defined by the burner, the wind-shield ring and the guide plates is not affected by outside airflow, and thus, the heating stability of the burner is ensured, and potential safety hazards are eliminated; and the users can observe the oil temperature condition in the turkey pot in real time through the temperature gauge.

The above description describes only several embodiments of the invention, but is not used for limiting the patent scope of the invention. All equivalent transformations based on the contents of the specification and drawings of the invention, or direct or indirect applications to relevant technical fields should fall within the patent protection scope of the invention.

What is claimed is:

1. A cooking device comprising:
a mounting base;
a heat-conduction block coupled to the mounting base and having a first surface configured to abut an outer circumferential wall of a pot and a second surface opposite the first surface and including one or more guide holes, the first surface having a shape that corresponds with a shape of the outer circumferential wall of the pot;
one or more guide rods coupled to the mounting base and slidably engaged to the one or more guide holes; and
a temperature controller coupled to the heat-conduction block.

2. The cooking device of claim 1, wherein the first surface has a concave arc shape.

3. The cooking device of claim 1, wherein the heat-conduction block includes a guide slope.

4. The cooking device of claim 1, wherein the one or more guide holes are two guide holes and the one or more guide rods are two guide rods.

5. The cooking device of claim 1, wherein the heat-conduction block includes a third surface extending between the first surface and the second surface, and wherein the temperature controller is configured to couple to the third surface.

6. The cooking device of claim 1, further comprising one or more elastic pieces configured to bias the heat-conduction block towards the pot.

7. The cooking device of claim 1, wherein the mounting base includes an opening, and wherein the heat-conduction block is at least partially disposed in the opening.

8. The cooking device of claim 1, wherein the mounting base includes a first end and a second end, the heat-conduction block coupled to the first end, and a gas pipeline coupled to the second end.

9. A cooking device comprising:
a pot;
a base including a leg stand and configured to receive the pot;
a mounting base coupled to the base;
one or more guide rods extending from the mounting base; and
a heat-conduction block including one or more guide holes slidably engaged to the one or more guide rods and having a surface configured to abut an outer circumferential wall of a pot.

10. The cooking device of claim 9, wherein the leg stand includes at least three vertical supports.

11. The cooking device of claim 10, further comprising: a base plate coupled to the at least three vertical supports.

12. The cooking device of claim 10, wherein each of the at least three vertical supports include a shock absorber configured to restrict scratching of the pot.

13. The cooking device of claim 12, wherein the shock absorber is a rubber pad.

14. The cooking device of claim 9, wherein the base includes a plurality of guide plates.

15. The cooking device of claim 14, wherein each of the plurality of guide plates include a guide slope.

16. The cooking device of claim 9, further comprising a temperature controller coupled to the heat-conduction block.

* * * * *